United States Patent [19]
Hibi et al.

[11] Patent Number: 5,368,875
[45] Date of Patent: Nov. 29, 1994

[54] METHOD OF MANUFACTURING RICH-FLAVORED ROASTED COFFEE BEANS AND GROUND ROASTED COFFEE BEANS

[75] Inventors: Haruo Hibi; Hirotoshi Yamanashi, both of Nagoya, Japan

[73] Assignee: Nagoyaseiraku Co., Ltd., Japan

[21] Appl. No.: 126,808

[22] Filed: Sep. 24, 1993

Related U.S. Application Data

[63] Continuation of Ser. No. 863,191, Apr. 3, 1992, abandoned.

[30] Foreign Application Priority Data

Sep. 25, 1991 [JP] Japan .................. 3-245985

[51] Int. Cl.$^5$ ............................... A23F 5/04
[52] U.S. Cl. ........................ 426/466; 426/595
[58] Field of Search ................ 426/595, 466–469

[56] References Cited

U.S. PATENT DOCUMENTS

| | | |
|---|---|---|
| 2,046,158 | 6/1936 | Gore . |
| 3,725,076 | 4/1973 | Stefanucci et al. . |
| 4,234,613 | 11/1980 | Lewis ................ 426/595 X |
| 5,064,676 | 11/1991 | Gore ................ 426/595 |

FOREIGN PATENT DOCUMENTS

| | | |
|---|---|---|
| 305276 | 6/1978 | Canada . |
| 1063864 | 10/1979 | Canada . |
| 2083410 | 3/1971 | France . |
| 2363995 | 9/1977 | France . |
| 47-20371 | 9/1972 | Japan . |
| 52-117471 | 10/1977 | Japan . |
| 60-25100 | 6/1985 | Japan . |
| 2022394 | 12/1979 | United Kingdom . |

OTHER PUBLICATIONS

Sivetz, Coffee User's Guide, 2nd Ed., 1963, Coffee Publications, San Anselmo, Calif., pp. 13–16.

*Primary Examiner*—Joseph Golian
*Attorney, Agent, or Firm*—Davis, Bujold & Streck

[57] ABSTRACT

A method of manufacturing roasted coffee beans which comprises the steps of roasting coffee beans and rapidly cooling the roasted beans to −17° C. or lower within 3.5 minutes after the roasting. If ground coffee beans are desired, an additional step of grinding the cooled roasted beans at a temperature of 20° C. or lower is carried out. The above method effectively slows down the process of flavor deterioration and provides rich-flavored coffee beans without requiring a complex, expensive freezing apparatus or coolant.

14 Claims, 2 Drawing Sheets

CORRELATION BETWEEN TIME REQUIRED TO FREEZE COFFEE BEANS TO -20°C AND TOTAL CARBON DIOXIDE GAS VOLUME

METHOD OF MANUFACTURING RICH-FLAVORED ROASTED COFFEE BEANS AND GROUND ROASTED COFFEE BEANS

This is a continuation of copending application Ser. No. 07/863,191, filed on Apr. 3, 1992 and now abandoned.

BACKGROUND OF THE INVENTION

This invention relates to a method of manufacturing tasty and aromatic roasted coffee beans and ground roasted coffee beans.

The following is one of the prevailing methods of manufacturing roasted coffee beans and ground roasted coffee beans.

a. Roasting

Coffee beans are roasted in a hot blast drum roaster for about 10 minutes with the hot blast temperature between 400° and 500° C. The temperature of the coffee beans is approximately 200° C. immediately after the roasting.

b. Cooling

The roasted coffee beans are air-cooled for about 5 minutes to room temperature (approximately 20° C.).

c. Blending

Several varieties of roasted coffee beans are blended.

d. Grinding

The blended coffee beans are ground, if desired.

e. Degasification

The roasted (and ground) coffee beans are stored in an airtight silo for 12 hours to 4 days for carbon dioxide degasification.

f. Packaging

The roasted coffee beans obtained at step (d) or the ground coffee beans at step (e) are packaged preferably in airtight containers.

The commercially available coffee beans manufactured according to the above method gradually deteriorate during storage, causing loss of the fresh rich flavor. Much of the rich flavor of coffee, attributable to the various chemical components produced by roasting, is lost by dispersion and change of the chemical components occurring after roasting. Volatile chemical components in the beans will be dispersed and lost as time passes while oxidation and other chemical changes will also occur, all contributing to the loss of flavor.

Even with improved packaging methods such as nitrogen gas replacement and vacuum packaging to prolong the shelf life, the flavor of coffee deteriorates fairly rapidly at room temperature. The process is intensified in the case of ground beans so that storage for weeks to months will result in substantial deterioration. Once a package is opened, loss and deterioration of the fresh flavor is particularly rapid. This is further intensified if the storage period has been long before opening the package. It is known that keeping roasted coffee beans at a low temperature is partially effective in preserving the fresh flavor. However, this low temperature storage method, though achieving limited success, does not significantly arrest the process of deterioration. For example, the loss/deterioration rate of coffee stored at 5° C. is only about one third of coffee stored at 25° C.

Other problems inherent in the above conventional manufacturing method include dispersion and loss of aromatic components caused by post-roasting residual heat, uneven secondary roasting also caused by post-roasting residual heat, and dispersion and loss of aromatic components caused by the heat generated while grinding roasted beans.

Among conventional manufacturing methods that freeze roasted beans below −17° C., the prevailing method comprises freezing roasted coffee beans by liquid nitrogen or some other inert gas or fluid before grinding to prevent dispersion and chemical change of aromatic the components. Japan Published Unexamined Patent Application No. S47-20371 discloses one such method, in which roasted coffee beans are ground after being frozen to −25° to −85° C. by liquid nitrogen injection.

There are other known freezing methods applicable to manufacturing instant coffee and coffee beverages, although, they are not directly related to the object and the method according to the present invention. Japan Published Unexamined Patent Application No. S52-117471 discloses pulverizing roasted beans after freezing the beans to a range of from −79° to −196° C. Japan Published Examined Patent Application No. S60-25100 (Japan Published Unexamined Patent Application No. S57-208947) discloses, in an ordinary method, freezing and pulverizing roasted beans impregnated with polyatomic alcohol. Japan Published Examined Patent Application No. S61-32944 (Japan Published Unexamined Patent Application No. S55-26887) discloses freezing beans with liquid nitrogen and pulverizing them to 45 microns or less. All three methods include the steps of pulverizing roasted beans into particles with a diameter of the order of tens of microns and adding the obtained particles to instant coffee obtained in ordinary manufacturing methods.

Although effectively preserving aromatic components, the above freezing methods are not suitable as methods of manufacturing ordinary roasted coffee beans because of the expensive, complex apparatuses required for using liquid nitrogen which raises the manufacturing costs.

SUMMARY OF THE INVENTION

An object of the present invention is to overcome the above-identified problems of the conventional methods and provide a method of manufacturing rich-flavored roasted (and ground) coffee beans which do not require a complex apparatus or a special coolant such as liquid nitrogen.

Another object of the present invention is to provide a method of manufacturing rich-flavored roasted (and ground) coffee beans at low manufacturing costs.

Still another object of the present invention is to provide a method of manufacturing rich-flavored roasted (arid ground) coffee beans not affected by post-roasting residual heat which deteriorates the aroma.

After conducting studies, the inventors found that rapid freezing of coffee beans immediately after roasting greatly delays the process of deterioration of aroma and further, that if coffee beans frozen in this method are ground at a temperature of 20° C. or lower, the process of aroma deterioration can be significantly delayed providing ground beans far superior to those produced according to the conventional methods.

The method of manufacturing roasted coffee beans according to the present invention comprises the steps of roasting coffee beans and rapidly cooling the roasted beans to −17° C. or lower within 3.5 minutes after the roasting.

The method of manufacturing ground roasted coffee beans further comprises the steps of roasting coffee beans, rapidly cooling the roasted beans to −17° C. or lower within 3.5 minutes after the roasting, and grinding the cooled roasted beans at 20° C. or lower.

According to the present invention, which is applicable to any variety of coffee beans, coffee beans may be roasted at a temperature between 400° and 500° C. for about 10 minutes in a hot blast drum roaster or roasted by any other roasting method.

The temperature of the roasted coffee should measure approximately 200° C. immediately after the roasting step. These roasted beans are immediately fed into a freezer to rapidly freeze the beans to at least −17° C. within 3.5 minutes after roasting. The freezer may be a blast freezer, a tunnel freezer, or a spiral freezer.

Rapid freezing proves effective if conducted as explained above, i.e., freezing the roasted beans to at least −17° C. within 3.5 minutes after roasting, presumably because the rapid temperature drop covers the transitional temperature range for preserving the flavor components.

The rapid freezing also prevents uneven secondary roasting caused by residual heat.

Experiments show that the roasted beans should be cooled below the predetermined temperature within 3.5 minutes. That is because if it takes more than 3.5 minutes, the flavor preservation effect will decrease, with the difference in preserved flavor between the present method and the air-cooling conventional method becoming less apparent.

If the roasted beans are frozen only to −10° C., the flavor will not be sufficiently preserved. On the other hand, if the beans are frozen to at least −25° C., a significant difference in flavor preservation is not achieved. Thus, excessive freezing is not economical and does not justify the additional costs incurred.

The beans manufactured as explained above may be shipped after being packaged into small amounts by an ordinary method.

If desired, the roasted beans obtained as described above are ground with the bean temperature maintained at 20° C. or below. Accordingly, it is necessary to use a grinder incorporating a device designed to maintain bean temperature at or below °C. such as a grinder manufactured by Nippon Granulator Co., Ltd. or a water-cooled roll grinder manufactured by PROBAT-WERKE von Gimborn GmbH & Co. KG.

The deterioration of flavor can be prevented if the bean temperature is maintained at about 20° C. during grinding. Although the lower grinding temperature at this step of the process produces a slightly better result, no substantial difference is observed below the grind temperature according to this invention (20° C.).

The ground beans may be shipped after being packaged into small amounts by an ordinary method.

The roasted (and ground) beans are preferably stored at a temperature of −20° C. or below. If stored at a temperature between room temperature and −10° C., the beans should be packed in containers which will not swell if gas expansion occurs. This especially applies to the non-ground beans which are not degassed.

BRIEF EXPLANATION OF THE ATTACHED DRAWINGS

DETAILED DESCRIPTION OF THE EMBODIMENTS

Figure 1:
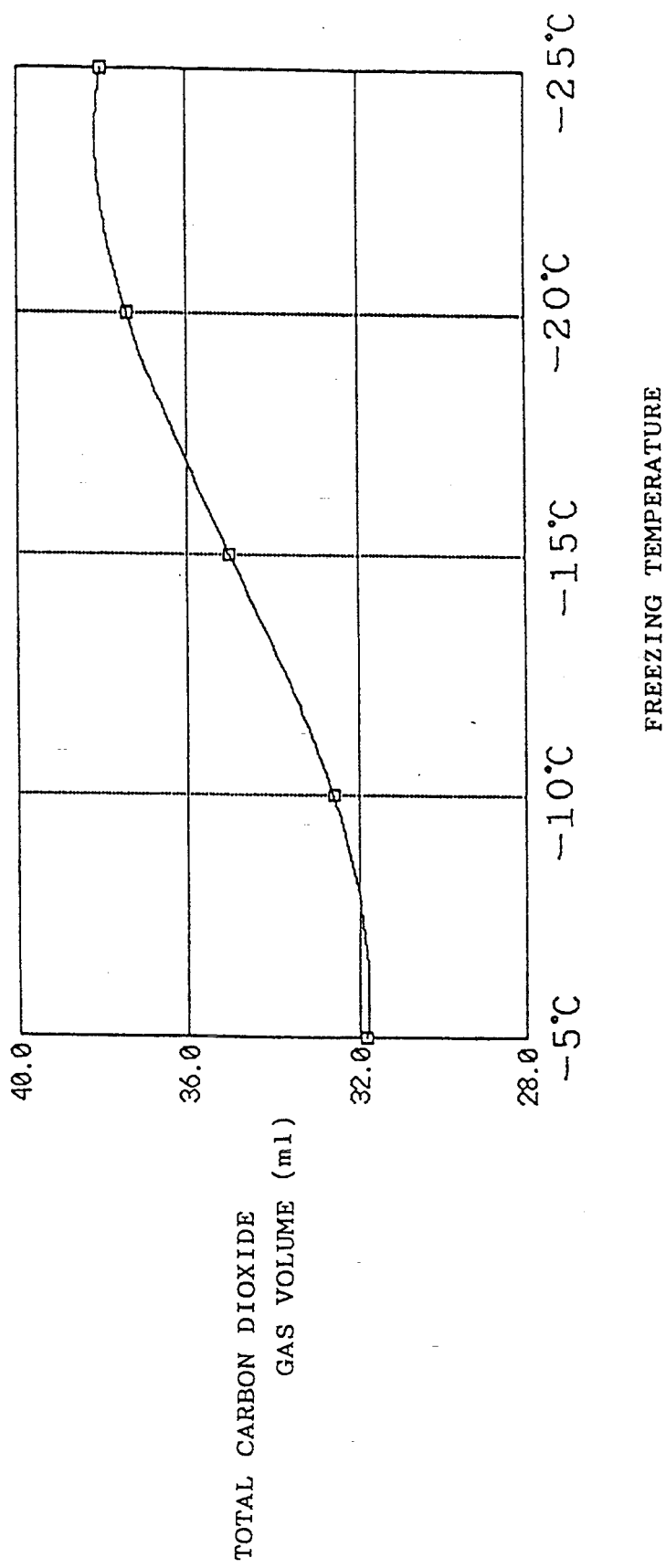
FIG. 1 shows the correlation between the post-roasting freezing temperature of coffee beans and the total carbon dioxide gas volume.

Preferred embodiments of the invention will be explained hereinafter referring to the attached drawings. It should be understood that although the following embodiments represent preferred forms of the invention, changes and variations can be made without departing from the scope and spirit of the invention.

Experiment 1

Three kilograms of Colombian supremo beans were roasted with a roaster manufactured by FUJIKOKI CO., LTD. The roasting continued until the L-value (lightness), representing the degree of roast of the beans, measured 23 with a color-difference meter manufactured by Nippon Denshoku Co., Ltd. under the trade name of ND1001 DP. The obtained roasted beans, with their temperature at about 200° C., were divided into three batches, with each batch cooled or frozen in a manner as described below.

The first batch (Reference 1) was air-cooled for 4 minutes to 26° C.

The second batch (Reference 2) was blast-frozen in minutes to −21° C. after 4 minutes' air-cooling.

The third batch (Embodiment 1) was blast-frozen to −21° C. in 1.8 minutes immediately after roasting.

Each batch of the beans was ground by a coffee grinder manufactured by LUCKY COFFEE MACHINE CO., LTD. under trade name of BONMAC Coffee Cutting Machine MB650. During the grinding operation, the grinder was maintained at 18° C. Each of Embodiment 1 and References 1 and 2 were divided and put in a plural of composite (PET/PE/Al/PE) containers, stored constant temperature units that maintained the inside temperature at 37° C., 25° C., 5° C., and −20° C., respectively, and used as samples for sensory analysis conducted over time. It should be noted that PET, PE, and Al stand for polyethyleneterephalate, polythylene, and aluminum foil.

For the test, coffee was made using 8 g of the ground beans of References 1 and 2, and Embodiment 1 per 100 ml of boiling water in a drip method using a paper filter holder sold by KALITA CO., LTD. Sixteen panelists sampled the coffee made from the three batches, each sample was divided and stored in the different constant temperature units and the panelists graded the samples according to the following marks.

+2: rich flavor of freshly roasted coffee maintained
+1: good
0: slight deterioration felt
−1: deterioration felt
−2: severe deterioration felt The significant difference was determined by a F-test and the least significant difference based on the obtained grades. The results are shown in Tables 1 and 2, in which a, b, and c represent References 1 and 2, and Embodiment 1, respectively.

TABLE 1

| STORAGE TEMPERATURE | | 5 DAYS | 10 DAYS | 20 DAYS | 30 DAYS | 45 DAYS | 60 DAYS |
|---|---|---|---|---|---|---|---|
| 37° C. | a | 1.31 | −0.44 | −1.25 | −1.69 | −1.81 | −1.81 |
|  | b | 1.25 | −0.13 | −1.00 | −1.63 | −1.88 | −1.88 |
|  | c | 1.38 | 0.44 | −0.44 | −1.25 | −1.56 | −1.56 |
| 25° C. | a | 1.25 | 1.38 | −0.19 | −0.88 | −1.69 | −1.81 |
|  | b | 1.38 | 0.44 | −0.25 | −0.88 | −1.44 | −1.88 |
|  | c | 1.75 | 0.06 | 0.44 | −0.38 | −1.25 | −1.63 |
| 5° C. | a | 1.31 | 1.25 | 1.06 | 0.81 | 0.56 | 0.31 |
|  | b | 1.44 | 1.38 | 0.94 | 0.88 | 0.69 | 0.50 |
|  | c | 1.94 | 1.75 | 1.50 | 1.19 | 1.13 | 0.88 |
| −20° C. | a | 1.50 | 1.38 | 1.25 | 1.25 | 1.31 | 1.25 |
|  | b | 1.63 | 1.44 | 1.38 | 1.38 | 1.44 | 1.25 |
|  | c | 2.00 | 1.81 | 1.81 | 1.81 | 1.88 | 1.81 |

TABLE 2

| STORAGE TEMPERATURE | SIGNIFICANT DIFFERENCE BETWEEN SAMPLES | 5 DAYS | 10 DAYS | 20 DAYS | 30 DAYS | 45 DAYS | 60 DAYS |
|---|---|---|---|---|---|---|---|
| 37° C. | a AND b | — | — | — | — | — | — |
|  | b AND c | — | ** | * | — | — | — |
|  | a AND c | — | ** | ** | * | * | — |
| 25° C. | a AND b | — | — | — | — | — | — |
|  | b AND c | * | ** | ** | ** | — | — |
|  | a AND c | ** | ** | ** | ** | * | — |
| 5° C. | a AND b | — | — | — | — | — | — |
|  | b AND c | * | — | ** | — | ** | — |
|  | a AND c | ** | * | ** | * | ** | ** |
| −20° C. | a AND b | — | — | — | — | — | — |
|  | b AND c | * | * | * | * | ** | ** |
|  | a AND c | ** | * | ** | ** | ** | ** |

Evaluation
—: no significant difference
*: significance level of 95%
**: significance level of 99%

Tables 1 and 2 show that Embodiment 1 received higher grades than References 1 and 2 after each elapse time period, hence proving the superior aroma preservation of Embodiment 1.

Experiment 2

Three kilograms of Colombian supremo beans were roasted with a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 DP. The obtained roasted beans, with their temperature at about 200° C., were divided into two batches, with each batch cooled or frozen in the manners as described below.

The first batch (Reference 3) was air-cooled for 4 minutes to 25° C.

The second batch (Embodiment 2) was blast-frozen in minutes to −21° C. immediately after roasting.

Each batch of beans was ground by a coffee grinder manufactured by LUCKY COFFEE MACHINE CO., LTD. under the trade name of BONMAC Coffee Cutting Machine BM-850. During the grinding operation, the grinder was maintained at about 18° C. Each of Embodiment 2 and Reference 3 was divided, sealed in a plural of composite (PET/PE/Al/PE) film containers under a reduced pressure of 10 mmHg, and stored in constant temperature units that maintained the inside temperature at 37° C., 25° C., 5° C., and −20° C., respectively, for measuring the carbon dioxide gas content of the ground beans and for conducting sensory analysis.

1. Measurement of the carbon dioxide gas content.

Fresh coffee is highly aromatic and swells a lot in a paper filter holder sold by KALITA CO., LTD. On the other hand, stale coffee is less aromatic and does not swell as much.

It is presumed that the swell in a paper filter holder sold by KALITA CO., LTD. is attributable to the carbon dioxide gas contained in ground coffee beans. It is also presumed that the carbon dioxide gas in ground coffee beans will be dispersed and lost with part of the aromatic components as time elapses. Therefore, the carbon dioxide gas content of ground coffee beans can be an index of the loss and deterioration of aroma.

The carbon dioxide gas content of the ground beans was determined according to the following formula:

$$(Carbon\ dioxide\ gas\ content) = (total\ carbon\ dioxide\ gas\ volume) - (discharged\ carbon\ dioxide\ gas\ volume)$$

In this formula, the content of total carbon dioxide gas (hereinafter total gas) is defined as the cubic volume of a film bag, which contained a 10 g sample of ground beans sealed under a reduced pressure of 10 mmHg after an elapsed time of 30 days with the temperature maintained at 37° C. The measurement of the total gas volume was carried out after 30 days because of the gas volume increase was found to level off after 20 to 25 days.

Also in the above formula, the discharged carbon dioxide gas volume is defined as the cubic volume of a film bag, which contained 10 g of sample ground beans sealed under a reduced pressure of 10 mmHg, after elapse of a given time under given conditions (discharged carbon dioxide gas is hereinafter referred to as discharged gas).

The gas volume was measured by submerging the film bags under water using syringes of 10 ml to 30 ml depending on the volume.

2. Sensory analysis.

Sensory analysis was conducted on the samples whose carbon dioxide gas content had been measured according to the above method. Sixteen panelists graded the coffee made from the samples in the same manner as in Experiment 1. Then, the total marks (points) of each sample were averaged as the score of the sample.

The test result shows that the coffee extracted from Embodiment 2 is superior to Reference 3 in preserving aroma.

Furthermore, the correlation between the scores and the carbon dioxide gas content was determined for the 64 samples on which the sensory analysis was conducted. The scores were plotted against the carbon dioxide gas content in a graph. A line drawn through the plotted dots is expressed in the formula:

$$y = 1.02 \cdot ln(x+1) - 1.70$$

In the above formula, y represents the score of each sample while x represents the carbon dioxide gas content.

The scattering of the line is 0.972 indicating a close correlation between the scores and the carbon dioxide gas content.

The results confirm that the carbon dioxide gas content can be an index of aroma deterioration. However, the volume of generated carbon dioxide gas is also closely related to the degree of roasting; the more the beans are roasted, the larger volume of carbon dioxide gas is generated. Therefore, the same beans with the same degree of roasting were used in the present test.

Experiment 3

(Embodiment 3)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001DP. The obtained roasted beans, with their temperature at about 200° C., were blast-frozen in 1.8 minutes to −21° C. immediately after roasting and ground with a coffee grinder manufactured by LUCKY COFFEE MACHINE CO., LTD. under the trade name of BONMAC Coffee Cutting Machine BM-650 to obtain samples. During the grinding operation, the grinder was maintained at 18° C.

(Reference 4)

Three kilograms of Colombian supremo beans were roasted in a roaster manufactured by FUJIKOKI CO., LTD. The roasting continued until the L-value (lightness) representing the degree of roast of the beans measured 23 with the color-difference meter manufactured by Nippon Denshoku Co., Ltd. under the trade name of ND1001DP to obtain samples. The obtained roasted beans, with their temperature at about 200° C., were air-cooled to 27° C. in 5 minutes and ground by the coffee grinder manufactured by LUCKY COFFEE MACHINE CO., LTD. under the trade name of BON-MAC Coffee Cutting Machine BM-650. During the grinding operation, the grinder was maintained at 18° C.

The samples of Embodiment 3 and Reference 4 were divided, sealed up in a plural of composite (PET/PE/Al/PE) film containers under a reduced pressure of 10 mmHg, and stored in constant temperature units that maintained the inside temperature at 37° C., 25° C., and 5° C., respectively, for measuring the carbon dioxide gas content over time. The measurement was conducted in the same manner as in Experiment 2. The results are shown in Table 3.

TABLE 3

| ELAPSED DAYS | EMBODIMENT 3 (ml) | | | REFERENCE 4 | | |
|---|---|---|---|---|---|---|
| | 37° C. | 25° C. | 5° C. | 37° C. | 25° C. | 5° C. |
| 4 | 14 | 22 | 30 | 12 | 16 | 22 |
| 8 | 9 | 16 | 26 | 7 | 11 | 18 |
| 12 | 6 | 13 | 22 | 4 | 8 | 16 |
| 16 | 4 | 11 | 18 | 1 | 6 | 13 |
| 20 | 1 | 9 | 15 | 0 | 4 | 11 |
| 24 | 0 | 7 | 13 | 0 | 3 | 10 |
| 30 | 0 | 4 | 10 | 0 | 2 | 7 |
| 42 | 0 | 2 | 6 | 0 | 0 | 4 |
| 46 | 0 | 1 | 5 | 0 | 0 | 3 |
| 50 | 0 | 0 | 4 | 0 | 0 | 2 |
| 55 | 0 | 0 | 3 | 0 | 0 | 1 |
| 60 | 0 | 0 | 2 | 0 | 0 | 0 |
| 64 | 0 | 0 | 1 | 0 | 0 | 0 |

Table 3 shows that Embodiment 3 is superior to Reference 4 in retaining carbon dioxide gas content at all of the storage temperatures, indicating that its carbon dioxide gas content takes a longer time period to decrease to zero. Therefore, the method according to the present invention preserves aroma better than the conventional method.

Experiment 4

Three kilograms of Cuban Crystalmountain beans were roasted with a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 DP. The obtained roasted beans, with their temperature at about 200° C. were divided into two batches, with each batch cooled or frozen in the manners as described below.

The first batch (Reference 5) was air-cooled for 4 minutes to 27° C.

The second batch (Embodiment 4) was blast-frozen in 1.8 minutes to −21° C. immediately after roasting.

Each batch of beans was ground by the coffee grinder manufactured by LUCKY COFFEE MACHINE CO., LTD. under the trade name of BONMAC Coffee Cutting Machine BM-650. During the grinding operation, the grinder was maintained at 18° C. Each of Embodiment 4 and Reference 5 was divided into samples and put in a plural of composite (PET/PE/Al/PE) film containers, and stored in constant temperature units that maintained the inside temperature at 37° C. for measuring the titratable acidity of each sample.

1. Measurement of titratable acidity.

The titratable acidity of Embodiment 4 and Reference 5 was measured over time by the following method:

a) pouring 100 ml of distilled water at about 95° C. into a 100 ml capacity beaker containing five grams of ground coffee beans;

b) stirring the coffee/water mixture for 3 minutes with a stirrer;

c) filtering out the ground coffee with a No.5A filter paper;

d) immediately cooling the filtrate (the coffee extract) to 10° C. by iced water;

e) pouring 100 ml of the coffee extract in a measuring flask; and f) determining the titratable acidity of the coffee extract at a temperature of 10° C. using 10/N NaOH by a potential difference automatic titrator manufactured by Kyoto Denshi Co., Ltd. under the trade name of AT-300 J with a pH of 7.00 as the end point. The titratable acidity is hereinafter represented by the consumption (ml) of 10/N NaOH.

2. Sensory analysis.

One and a half kilograms of Cuban Crystalmountain beans were roasted with a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 Dr. The obtained roasted beans, with their temperature at about 200° C., were air-cooled for 4 minutes and ground within 5 hours by a grinder manufactured by LUCKY COFFEE MACHINE CO., LTD. under the trade name of BONMAC Coffee Cutting Machine BM-850 to obtain Reference A.

Coffee was made from 8 g of the sample per 100 ml of boiling water using a paper filter holder sold by KALITA CO., LTD. Sensory analysis was conducted over time by having 16 panelists compare the coffee of Reference A with that of Reference 5 and Embodiment 4.

Coffee, extracted from Reference 5 and Embodiment 4 in the same manner as Reference A, was graded according to the following marks:

+2: not different from the coffee of Reference A
+1: slightly different from the coffee of Reference A
0: different from the coffee of Reference A
−1: greatly different from the coffee of Reference A
−2: extremely different from the coffee of Reference A The total of the panelists' marks were averaged for the score of Reference 5 and Embodiment 4. The results of the measurement and test are shown in Table 4.

Because the period of time required for the titratable acidity to level off coincided well with the shelf life obtained based on the sensory analysis, the above period is designated as the provisional shelf life of freshly ground coffee. Table 5 shows the provisional shelf lives for Reference 5 and Embodiment 4 determined by a regression calculation.

Embodiment 4 had a longer shelf life than Reference thus remaining fresher.

TABLE 5

|  | PROVISIONAL SHELF LIFE (DAYS) |
| --- | --- |
| REFERENCE 5 | 4.02 |
| EMBODIMENT 4 | 5.52 |

The titratable acidity was measured of the following embodiments to determine their shelf lives in view of the close correlation between shelf live and titratable acidity.

The above experiments prove that the coffee beans or the invention, which were rapidly frozen to about −20° C. shortly after roasting, are superior to the coffee beans air-cooled after roasting in retention of aroma, deterioration of flavor, and shelf life.

Experiment 5

(Embodiment 5)

Three kilograms of Colombian supremo beans were roasted in a roaster manufactured by FUJIKOKI CO., LTD. The roasting was continued until the L-value (lightness), representing the degree of roast of the beans, measured 25 with the color-difference meter manufactured by Nippon Denshoku Co., Ltd. under the trade name of ND1001 Dr. The obtained roasted beans, with their temperature at about 190° C., were blast-frozen in 2.5 minutes to −35° C. immediately after roasting and ground with a coffee grinder manufactured by LUCKY COFFEE MACHINE CO., LTD. under the trade name of BONMAC Coffee Cutting Machine BM-650 to obtain samples. During the grinding operation, the grinder was maintained at about 18° C.

(Reference 6)

Three kilograms of Colombian supremo beans were roasted in a roaster manufactured by FUJIKOKI CO., LTD. The roasting continued until the L-value (lightness), representing the degree of roast of the beans,

TABLE 4

| REFERENCE 5 | | | EMBODIMENT 4 | | |
| --- | --- | --- | --- | --- | --- |
| ELAPSED DAYS | TITRATABLE ACIDITY | FLAVOR GRADE | ELAPSED DAYS | TITRATABLE ACIDITY | FLAVOR GRADE |
| 0 | 3.82 | 1.94 | 0 | 3.92 | 2.00 |
| 1 | 3.48 | 1.13 | 1 | 3.54 | 1.43 |
| 2 | 3.24 | 0.94 | 2 | 3.37 | 1.19 |
| 3 | 2.97 | 0.69 | 3 | 3.08 | 0.81 |
| 4 | 2.73 | −0.06 | 4 | 2.84 | 0.25 |
| 6 | 2.76 | −1.25 | 6 | 2.64 | −0.94 |
| 8 | 2.72 | −1.44 | 8 | 2.68 | −1.31 |
| 10 | 2.68 | −1.63 | 10 | 2.63 | −1.44 |
| 12 | 2.73 | −1.75 | 12 | 2.67 | −1.63 |
| 14 | 2.74 | −1.75 | 14 | 2.62 | −1.63 |
| 16 | 2.86 | −1.75 | 16 | 2.78 | −1.63 |

The titratable acidity drastically lowered during the early days, leveled off later, and started to rise again.

The high scores of the sensory analysis coincided with the period when the titratable acidity was drastically lowering. On the other hand, scores became even lower when the titratable acidity leveled off.

measured 25 with the color-difference meter manufactured by Nippon Denshoku Co., Ltd. under the trade name of ND1001DP to obtain samples. The obtained roasted beans, with their temperature at about 190° C., were air-cooled to 27° C. in 5 minutes and ground with a coffee grinder manufactured by LUCKY COFFEE MACHINE CO., LTD. under the trade name of BON-MAC Coffee Cutting Machine BM-650. During the grinding operation, the grinder was maintained at about 18° C.

The samples of Embodiment 5 and Reference 6 were divided, sealed up in a plural of composite (PET/PE/Al/PE) film containers, and stored in constant temperature units that maintained the inside temperature at 37° C. and 25° C. for measuring the titratable acidity over time to calculate the shelf lives in the same manner as in Experiment 3. The results are shown in Table 6.

TABLE 6

|  | PROVISIONAL SHELF LIFE (DAYS) AT 25° C. | PROVISIONAL SHELF LIFE (DAYS) AT 37° C. |
|---|---|---|
| EMBODIMENT 5 | 11.00 | 6.48 |
| REFERENCE 6 | 7.12 | 4.53 |

Embodiment 5 clearly had a longer shelf life, thus remaining fresh for a longer period of time.

Experiment 6

(Embodiment 6)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 Dr. The obtained roasted beans, with their temperature at about 200° C., were blast-frozen in 2.0 minutes to −22° C. immediately after roasting.

(Embodiment 7)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 Dr. The obtained roasted beans, with their temperature at about 200° C., were blast-frozen in 2.8 minutes to −29° C. immediately after roasting.

(Reference 7)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001DP to obtain samples. The obtained roasted beans, with their temperature at about 200° C., were air-cooled to 27° C. in 4 minutes.

(Reference 8)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001DP to obtain samples. The obtained roasted beans, with their temperature at about 200° C., were air-cooled to 27° C. in 4 minutes and then blast-frozen to −20° C. in 1.4 minutes.

(Reference 9)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001DP to obtain samples. The obtained roasted beans, with their temperature at about 200° C., were blast-frozen in 1.4 minutes to 0° C. immediately after roasting.

(Reference 10)

Three kilograms of Colombian supremo beans were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001DP to obtain samples. The obtained roasted beans, with their temperature at about 200° C., were blast-frozen in 1.6 minutes to −11° C. immediately after roasting.

The roasted beans of Embodiments 6 and 7, and References 7 to 10 were ground with a grinder manufactured by LUCKY COFFEE MACHINE CO., LTD. under the trade name of BONMAC Coffee Cutting Machine BM-650. The obtained ground beans were divided, sealed in a plural of composite (PET/PE/Al/PE) film containers under a reduced pressure of 10 mmHg, and stored in a constant temperature unit that maintained the inside temperature at 37° C. for measuring the total gas volume (carbon dioxide gas content). Five measurements were taken on each Embodiment and Reference in the same manner as Experiment 2. The results are shown in Table 7.

TABLE 7

|  | EMBODIMENT 6 | EMBODIMENT 7 | REFERENCE 7 | REFERENCE 8 | REFERENCE 9 | REFERENCE 10 |
|---|---|---|---|---|---|---|
| TOTAL GAS VOLUME (ml) | 36 | 38 | 30 | 30 | 31 | 32 |
|  | 37 | 36 | 28 | 30 | 32 | 34 |
|  | 38 | 38 | 29 | 30 | 32 | 33 |
|  | 38 | 38 | 30 | 31 | 31 | 31 |
|  | 38 | 38 | 29 | 29 | 32 | 33 |
| AVERAGE | 37.4 | 37.6 | 29.2 | 30.0 | 31.6 | 32.6 |

Table 7 shows that Embodiments 6 and 7 have larger total gas volumes than References 7 to 10.

Furthermore, the ground beans of Embodiments 6 and 7, and References 7 to 10 were divided and put in a plural of composite (PET/PE/Al/PE) film containers, and stored in constant temperature units that maintain the inside temperature at 5° C. and 25° C., respectively, to be used as samples for sensory analysis conducted over time. Twenty-five panelists took part in a sensory analysis to determine the significant difference by a F-test and the least significant difference in the same manner as in Experiment 1. The results are shown in Tables 8 and 9.

TABLE 8

| | STORED AT 5° C. | | | STORED AT 25° C. | | |
|---|---|---|---|---|---|---|
| | 10 DAYS | 30 DAYS | 60 DAYS | 10 DAYS | 30 DAYS | 60 DAYS |
| EMBODIMENT 6 | 1.96 | 1.52 | 1.04 | 1.40 | −0.04 | −1.60 |
| EMBODIMENT 7 | 1.96 | 1.48 | 1.00 | 1.44 | 0.00 | −1.56 |
| REFERENCE 7 | 1.60 | 1.00 | 0.56 | 0.88 | −0.36 | −1.80 |
| REFERENCE 8 | 1.72 | 1.12 | 0.64 | 1.00 | −0.32 | −1.72 |
| REFERENCE 9 | 1.64 | 1.04 | 0.64 | 0.88 | −0.40 | −1.68 |
| REFERENCE 10 | 1.56 | 1.04 | 0.60 | 0.94 | −0.32 | −1.76 |

TABLE 9

| | | | REFERENCE 7 | REFERENCE 8 | REFERENCE 9 | REFERENCE 10 |
|---|---|---|---|---|---|---|
| 5° C. | 10 DAYS | EMBODIMENT 6 | * | — | — | * |
| | | EMBODIMENT 7 | * | — | — | * |
| | 30 DAYS | EMBODIMENT 6 | ** | ** | ** | ** |
| | | EMBODIMENT 7 | ** | * | ** | ** |
| | 60 DAYS | EMBODIMENT 6 | ** | * | * | ** |
| | | EMBODIMENT 7 | ** | * | * | * |
| 25° C. | 10 DAYS | EMBODIMENT 6 | ** | * | ** | ** |
| | | EMBODIMENT 7 | ** | ** | ** | ** |
| | 30 DAYS | EMBODIMENT 6 | — | — | — | — |
| | | EMBODIMENT 7 | — | — | * | — |
| | 60 DAYS | EMBODIMENT 6 | — | — | — | — |
| | | EMBODIMENT 7 | — | — | — | — |

Evaluation
—: no significant difference
*: significance level of 95%
**: significance level of 99%

Tables 8 and 9 indicate that Embodiments 6 and 7 retain aroma better than References 7 and 10 at all of the storage temperatures, confirming that the larger total gas volume means a higher aroma retentivity if taken with the results shown in Tables 7. For the test, coffee was made from 8 g of the beans of Embodiments 8 and 7, and References 7 to 10 per 100 ml of boiling water in the drip method using a paper filter holder sold by KALITA CO., LTD. The coffee beans were ground within 30 minutes before the testing by BONMAC Coffee Cutting Machine BM-650 (product of LUCKY COFFEE MACHINE CO., LTD.).

Experiment 7

(Embodiment 8)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP. The obtained roasted beans, with their temperature at about 200° C., were blast-frozen in 2.0 minutes to −22° C. immediately after roasting.

(Embodiment 9)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP. The obtained roasted beans, with their temperature at about 200° C., were blast-frozen in 2.8 minutes to −21° C. immediately after the roasting.

(Reference 11)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP to obtain samples. The obtained roasted beans, with their temperature at about 200° C., were air-cooled to 28° C. in 4 minutes.

(Reference 12)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP to obtain samples. The obtained roasted beans, with their temperature at about 200° C., were immediately blast-frozen to −21° C. in 4.2 minutes.

(Reference 13)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP. The obtained roasted beans, with their temperature at about 200° C., were blast-frozen in 5.3 minutes to −20° C. immediately after the roasting.

(Reference 14)

Three kilograms of Colombian supremo beans were roasted in a roaster manufactured by FUJIKOKI CO., LTD. The roasting continued until the L-value (lightness), representing the degree of roast of the beans, measured 24 with the color-difference meter manufactured by Nippon Denshoku Co., Ltd. under the trade name of ND1001DP. The obtained roasted beans, with their temperature at about 200° C., were blast-frozen in 6.2 minutes to −21° C. immediately after roasting.

The roasted beans of Embodiments 8 and 9, and References 11 to 14 were divided, sealed in a plural of composite (PET/PE/Al/PE) film containers, and stored in a constant temperature unit that maintained the inside temperature at 5° C. and 25° C. for conducting sensory analysis over time. Twenty five panelists participated in the test conducted in the same manner as Experiment 1 to determine the significant difference based on a F-test and the least significant difference. Tables 10 and 11 show the results.

For the test, coffee was extracted using 8 g of the beans of Embodiments 8 and 9, and References 11 to 14 per 100 ml of boiling water in the drip method. The beans used in the test were ground less than 30 minutes before the testing.

TABLE 10

|  | STORED AT 5° C. | | | STORED AT 25° C. | | |
| --- | --- | --- | --- | --- | --- | --- |
|  | 10 DAYS | 30 DAYS | 60 DAYS | 10 DAYS | 30 DAYS | 60 DAYS |
| EMBODIMENT 8 | 1.96 | 1.48 | 1.08 | 1.36 | 0.08 | −1.52 |
| EMBODIMENT 9 | 1.92 | 1.44 | 1.04 | 1.40 | 0.04 | −1.56 |
| REFERENCE 11 | 1.60 | 1.00 | 0.64 | 0.92 | −0.32 | −1.72 |
| REFERENCE 12 | 1.72 | 1.00 | 0.68 | 1.00 | −0.24 | −1.68 |
| REFERENCE 13 | 1.72 | 0.96 | 0.64 | 0.96 | −0.24 | −1.64 |
| REFERENCE 14 | 1.64 | 0.96 | 0.60 | 0.92 | −0.28 | −1.76 |

TABLE 11

|  |  |  | REFERENCE 11 | REFERENCE 12 | REFERENCE 13 | REFERENCE 14 |
| --- | --- | --- | --- | --- | --- | --- |
| 5° C. | 10 DAYS | EMBODIMENT 8 | ** | — | — | * |
|  |  | EMBODIMENT 9 | * | — | — | — |
|  | 30 DAYS | EMBODIMENT 8 | ** | ** | ** | ** |
|  |  | EMBODIMENT 9 | ** | ** | ** | ** |
|  | 60 DAYS | EMBODIMENT 8 | ** | ** | ** | ** |
|  |  | EMBODIMENT 9 | ** | * | ** | ** |
| 25° C. | 10 DAYS | EMBODIMENT 8 | ** | * | * | ** |
|  |  | EMBODIMENT 9 | ** | * | ** | ** |
|  | 30 DAYS | EMBODIMENT 8 | * | — | — | * |
|  |  | EMBODIMENT 9 | * | — | — | — |
|  | 60 DAYS | EMBODIMENT 8 | — | — | — | — |
|  |  | EMBODIMENT 9 | — | — | — | — |

Evaluation
—: no significant difference
*: significance level of 95%
**: significance level of 99%

Tables 10 and 11 indicate that Embodiments 8 and 9 are superior to References 11 to 14 in remaining fresh.

Experiment 8

The purpose of Experiment 8 was to determine how roasted coffee beans exhibited different characteristics when cooled to various temperatures over the same time period.

Five batches of Colombian supremo beans, each weighing 3 kg, were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 DP. The obtained roasted beans, with their temperature at about 200° C., were immediately blast-frozen in 2.5 minutes to the following temperatures:
 −28° C. (Embodiment 10);
 −19° C. (Embodiment 11);
 −15° C. (Reference 15);
 −10° C. (Reference 18); and
 −4° C. (Reference 17).

After being ground in the grinder manufactured by LUCKY COFFEE MACHINE CO., LTD. under the trade name of MB650, the roasted beans of Embodiments 10 and 11, and References 15 to 17 were divided, sealed in a plural of composite (PET/PE/Al/PE) film containers under a reduced pressure of 10 mmHg, and stored in a constant temperature unit that maintained the inside temperature at 37° C. Then, the total gas volume was measured for each batch in the same manner as in Experiment 2.

The results of the measurements shown in FIG. 1 exhibit a distinctive difference between Embodiments 10 and 11, and References 15 to 17 in total gas volume.

Experiment 9

The purpose of Experiment 9 was to determine how coffee beans cooled to a predetermined temperatures over different periods of time resulted in different characteristics.

Six batches of Colombian supremo beans, each weighing 3 kg, were roasted in a roaster manufactured by FUJIKOKI CO., LTD. The roasting continued until the L-value (lightness), representing the degree of roast of the beans, measured 23 with the color-difference meter manufactured by Nippon Denshoku Co., Ltd. under the trade name of ND1001 DP. The obtained roasted beans, with their temperature at about 200° C., were immediately blast-frozen to −20° C. during the following periods of the time:
 2 minutes (Embodiment 12);
 3 minutes (Embodiment 13);
 3.5 minutes (Embodiment 14);
 4 minutes (Reference 18);
 5 minutes (Reference 19); and
 6 minutes (Reference 20).

After being ground in the grinder manufactured by LUCKY COFFEE MACHINE CO., LTD. under the trade name of BONMAC Coffee Cutting Machine MB650, the roasted beans of Embodiments 12 to 14, and References 18 to 20 were divided, sealed in a plural of composite (PET/PE/Al/PE) film containers under a reduced pressure of 10 mmHg, and stored in a constant temperature unit that maintained the inside temperature at 37° C. Then, the total gas volume was measured for each batch in the same manner as in Experiment 2. The results of the measurements shown in FIG. 2 exhibit distinctive difference between Embodiments 12 and 14, and References 15 to 17 in total gas volume.

Review of the Experiments

Tables 1 to 7 clearly show that the ground coffee beans of the present invention excel over the ground coffee beans processed according to the conventional method in preserving freshness.

Tables 8 to 11 show that the superiority of the present, invention to the conventional method also applies to non-ground, whole roasted beans.

FIG. 1 clearly shows that the beans cooled to the temperature range of the invention is superior to the ones outside the range of the invention in retaining total gas volume over the same period of time.

Figure 2:
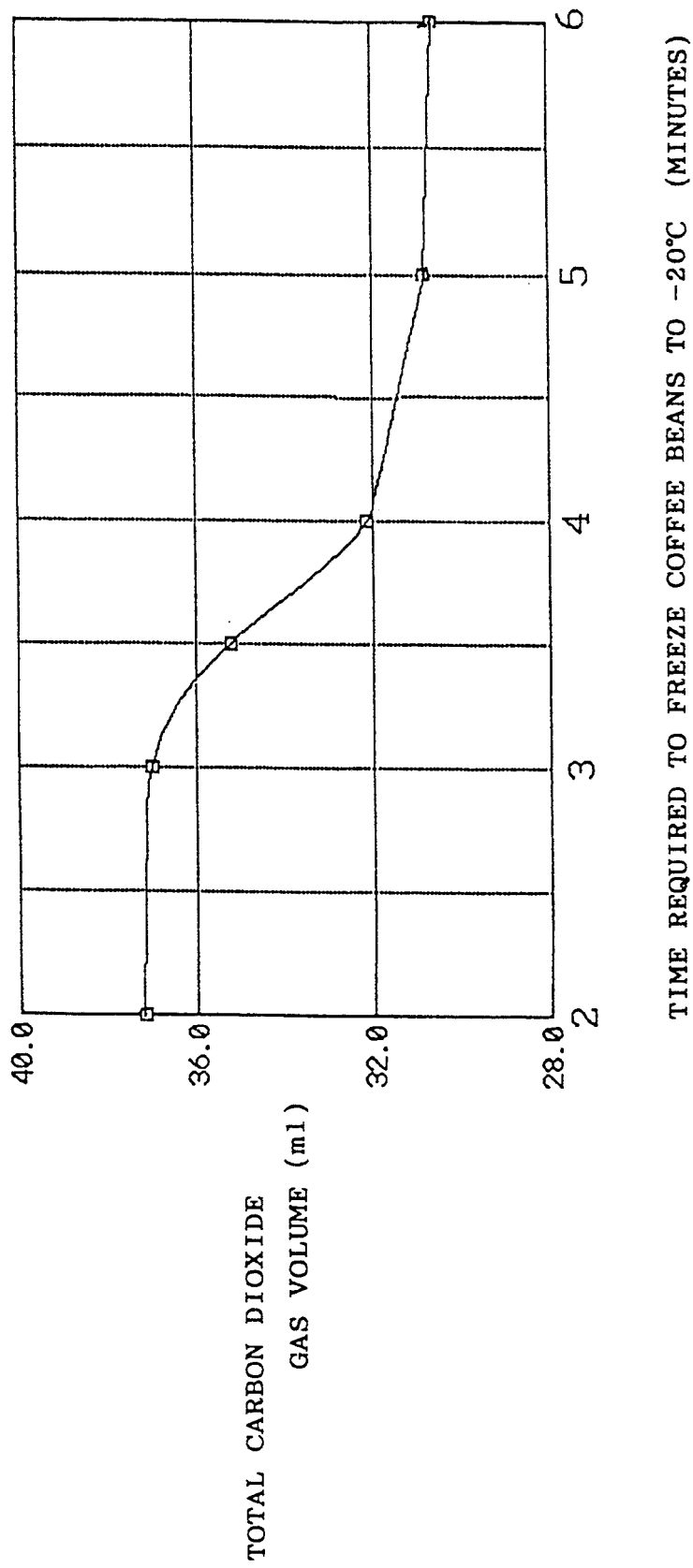
FIG. 2 shows the correlation between the time to freeze coffee beans to −20° C. and the total carbon dioxide gas volume.

FIG. 2 clearly shows that the beans cooled to a predetermined temperature in the cooling time range according to the invention is superior to the beans outside the cooling time range of the invention in retaining total gas volume.

The sensory analysis of Experiments 8 and 7, in which roasted beans were cooled to various temperatures, shows that Embodiments 8 and 7, not References 9 and 10, significantly differed from Reference 7 processed according to a conventional method.

Of Embodiments 8 and 9, and References 8, 13, and 14, which reached $-20°$ C. over different time periods, Embodiments 8 and 9 are in the time range according to the invention. It was Embodiments 8 and 9 that significantly differed from Reference 11 processed according to he conventional method. It is also concluded that roasted beans cooled to $-20°$ C. in 4 minutes proves slightly superior to the beans processed according to the conventional method. However, if cooling takes longer that 5 minutes, the result will be hardly better than the conventional method.

The above Experiments show that the beans rapidly frozen to about $-20°$ C. are markedly superior to the air-cooled beans in carbon dioxide gas content. It is also shown that the former beans are superior to the latter in aroma retentivity, flavor deterioration over time, shelf life, and other characteristics, thereby exhibiting a close correlation with the carbon dioxide gas content and these characteristics.

Furthermore, the post-roasting freezing time and temperature were varied to determine favorable time and temperature ranges as shown in the other Experiments above. These Experiments verify that freezing beans to at least $-17°$ C. within 3.5 minutes is essential to obtain excellent coffee beans having a superior shelf life, flavor retentivity, low flavor deterioration over time, and other characteristics.

It was also determined upon varying the grinding temperature that the coffee beans of the invention, which are frozen to at least $-17°$ C. within 3.5 minutes after roasting, should be ground at a temperature of 20° C. or lower for a good result.

Moreover, the processing method according to the invention was compared with the expensive liquid nitrogen method, in which beans are ground after being frozen with liquid nitrogen, only to show a negligible difference in flavor.

Various water/coffee ratios were tested on both the present-invention coffee beans and the conventional beans. The results also prove the superiority of the method of the present invention. Six and a half to 7 g of the present-invention coffee per 100 ml boiling water produced the flavor (taste and aroma) equivalent to 8 g of the conventional coffee per 100 ml boiling water. Having a higher flavor retentivity, the present invention produces, with a smaller amount of coffee, the same level of flavor as that produced by the conventional method.

Summary

As explained above, coffee beans are rapidly frozen to at least $-17°$ C. within 3.5 minutes after roasting according to the invention. This rapid-freeze method results in a substantial delay of flavor deterioration and in prevention of uneven roasting otherwise caused by secondary, residual-heat roasting.

If the present-invention beans are ground at 20° C. or lower, products of much higher quality are obtained without freezing the beans by liquid nitrogen before grinding, or resorting to other costly methods.

Moreover, reducing the temperature to $-17°$ C. or less does not require a complex, costly apparatus or special coolant, but a simple blast freezer will suffice, thereby cutting the manufacturing costs.

Having higher flavor retentivity, the present-invention coffee requires a smaller amount of beans than the conventional coffee to obtain substantially the same level of flavor. Thus, the present invention contributes to a resource saving.

If the product according to the present invention is packaged airtightly without degassing and stored at temperatures of $-17°$ C. or lower, the fresh flavor will be retained even longer.

If ground and packaged in an atmosphere of cooled nitrogen, carbon dioxide gas, or some other inert gas, the coffee beans of the present invention will have a still higher flavor retentivity.

What is claimed is:

1. A method of manufacturing roasted coffee beans to maximize flavor and aroma retention of the roasted coffee beans and increase shelf life of the coffee, comprising the steps of:

a) roasting a desired quantity of coffee beans so that the roasted coffee beans have a temperature of approximately 200° C., depending upon a desired degree of roasting of the coffee beans;

b) rapidly cooling, with cooled dry air, the desired quantity of roasted beans from a temperature of approximately 200° C., depending upon a desired degree of roasting, to a temperature between about $-17°$ C. and about $-35°$ C. within 3.5 minutes immediately after termination of roasting so as to maximize flavor and aroma retention of the roasted coffee beans and to increase shelf life of the coffee; and c) packaging the roasted coffee beans in an air tight container without degasification.

2. A method of manufacturing roasted coffee beans according to claim 1, wherein said roasted coffee beans are rapidly cooled down to at least about $-19°$ C.

3. A method of manufacturing roasted coffee beans according to claim 1, wherein said roasted coffee beans are rapidly cooled from about $-17°$ C. to about $-35°$ C. within about 3 minutes immediately after termination of roasting.

4. A method of manufacturing roasted coffee beans according to claim 1, wherein said roasted coffee beans are rapidly cooled down to at least about $-19°$ C. within about 3 minutes immediately after termination of roasting.

5. A method of manufacturing roasted coffee beans according to claim 1, wherein said step of rapidly cooling said roasted coffee beans is carried out by one of a blast freezer, a tunnel freezer and a spiral freezer.

6. A method of manufacturing roasted coffee beans according to claim 1, further comprising the step of:

storing the packaged roasted coffee beans at a temperature below −17° C.

7. A method of manufacturing roasted coffee beans according to claim 1, wherein said roasted coffee beans are packaged in an atmosphere comprising one of nitrogen and carbon dioxide gas.

8. A method of manufacturing roasted and ground coffee to maximize flavor and aroma retention of the roasted and ground coffee by maximizing retention of gases contained in the coffee, comprising the steps of:
   a) roasting a desired quantity of coffee beans so that the roasted coffee beans have a temperature of about 200° C., depending upon a desired degree of roasting of the coffee beans;
   b) rapidly cooling, using cooled dry air, the desired quantity of roasted beans from a temperature of about 200°C., depending upon a desired degree of roasting, to a temperature of between about −17° C. and about −35° C. within 3.5 minutes immediately after termination of roasting so as to prevent uneven secondary roasting caused by residual heat and to maximize flavor and aroma retention of the roasted coffee beans by maximizing retention of gases contained in the ground coffee;
   c) allowing the temperature of the rapidly cooled roasted coffee beans to rise to a temperature of no higher than 20° C. prior to grinding the roasted coffee beans;
   d) grinding the desired quantity of rapidly cooled roasted beans at a temperature of 20° C. or lower; and
   e) packaging the ground coffee in an air tight container without degasification.

9. A method of manufacturing roasted and ground coffee according to claim 8, wherein said roasted coffee beans are rapidly cooled down to at least about −19° C.

10. A method of manufacturing roasted and ground coffee according to claim 8, wherein said roasted coffee beans are rapidly cooled from about −17° C. to about −35° C. within about 3 minutes immediately after termination of roasting.

11. A method of manufacturing roasted and ground coffee according to claim 8, wherein said roasted coffee beans are rapidly cooled down to at least about −19° C. within about 3 minutes immediately after termination of roasting.

12. A method of manufacturing roasted and ground coffee according to claim 8, wherein said step of rapidly cooling said roasted coffee beans is carried out by one of a blast freezer, a tunnel freezer and a spiral freezer.

13. A method of manufacturing roasted and ground coffee according to claim 8, further comprising the step of:
   storing the packaged ground coffee at a temperature below −17° C.

14. A method of manufacturing roasted and ground coffee according to claim 8, wherein said roasted coffee beans are ground in an atmosphere comprising one of nitrogen and carbon dioxide gas.

* * * * *